United States Patent [19]
Crump et al.

[11] Patent Number: 6,091,999
[45] Date of Patent: Jul. 18, 2000

[54] APPARATUS AND METHOD FOR CREATING THREE-DIMENSIONAL MODELING DATA FROM AN OBJECT

[75] Inventors: Craig D. Crump, Eden Prairie; Joseph M. Bergmann, Shoreview; Kenneth R. Kressin, Apple Valley, all of Minn.

[73] Assignee: The Crump Group, Inc., Eden Prairie, Minn.

[21] Appl. No.: 09/152,218

[22] Filed: Sep. 11, 1998

Related U.S. Application Data

[63] Continuation-in-part of application No. 08/638,915, Apr. 25, 1996, Pat. No. 5,880,961, which is a continuation-in-part of application No. 08/284,253, Aug. 2, 1994, Pat. No. 5,621,648.

[51] Int. Cl.[7] .................................................... G06F 17/00
[52] U.S. Cl. ........................................ 700/112; 700/114
[58] Field of Search ............................... 395/115; 396/13, 396/25; 700/215, 120, 112, 193, 161

[56] References Cited

U.S. PATENT DOCUMENTS

| | | | |
|---|---|---|---|
| 4,168,897 | 9/1979 | Gates | 396/25 |
| 5,040,007 | 8/1991 | Hagiuda | 395/115 |
| 5,323,327 | 6/1994 | Carmicheal et al. | 364/478.03 |
| 5,621,648 | 4/1997 | Crump | 364/468.19 |
| 5,710,645 | 1/1998 | Thompson | 396/13 |
| 5,880,961 | 3/1999 | Crump | 364/468.19 |

Primary Examiner—Paul P. Gordon
Assistant Examiner—Kidest Bahta
Attorney, Agent, or Firm—Moore & Hansen

[57] ABSTRACT

The present invention provides a method and apparatus for the creation of a electronic domain geometric modeling data file containing internal and external features of an object of interest by first successively removing contours of material forming the object to form exposed surfaces and thereby reveal the internal and external features contour by contour and second by subsequently, successively acquiring data relative to the exposed surfaces. The geometry of each exposed surface is obtained, processed and recorded after each contour is removed. The processing is converted to perimeter data to define the internal and external features and surfaces of the object and the perimeter data is combined to yield a three dimensional electronic domain representation of the object. If desired this representation can be displayed on a computer monitor or printed onto paper. In a representative embodiment of the present invention a face mill is provided to remove the contours, a scanner is used to obtain the data relative to the exposed surfaces, and a shuttle is used to transport the object between the mill and the scanner for alternating steps of material removal and scanning.

10 Claims, 9 Drawing Sheets

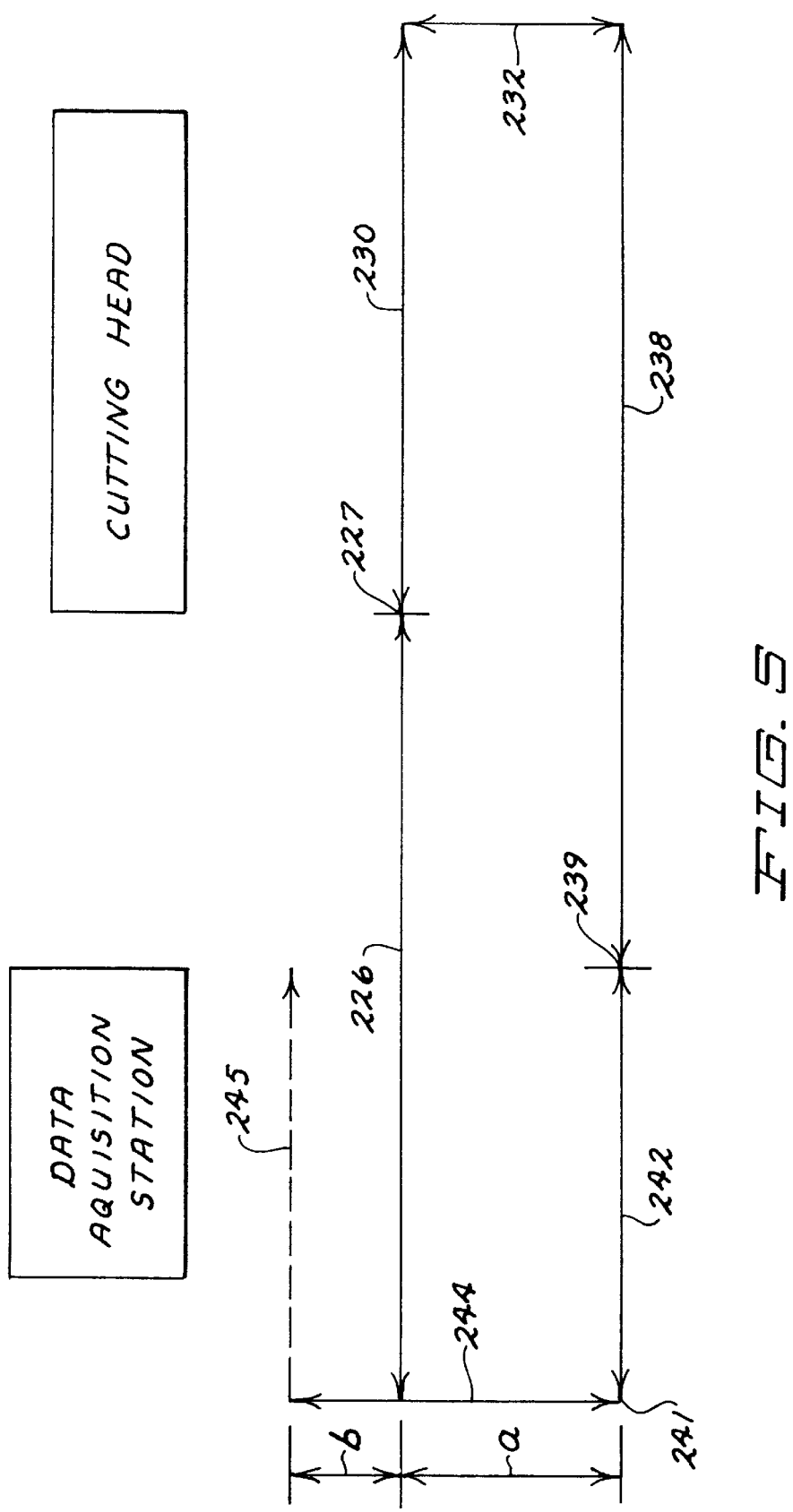

APPARATUS AND METHOD FOR CREATING THREE-DIMENSIONAL MODELING DATA FROM AN OBJECT

This application is a continuation-in-part of pending application Ser. No. 08/638,915, filed Apr. 25, 1996, now U.S. Pat. No. 5,880,961 which is a continuation-in-part of application Ser. No. 08/284,253 filed Aug. 2, 1994 and now issued as U.S. Pat. No. 5,621,648.

FIELD OF THE INVENTION

The present invention relates in general to method and apparatus for producing an electronic representation of an object. In particular, the present invention relates to an apparatus and a method for selective destruction of an object and its reproduction in computer memory and associated displays as well as in a hard copy form, such as paper.

BACKGROUND OF THE PRESENT INVENTION

There exist known methods for producing three dimensional images in an electronic domain from solid physical objects. Typically, these methods involve some form of data acquisition of information relative to the exterior surfaces of the object, either by contact or non-contact means. The result is a computer generated image of the exterior surface of the object. For example, one such method involves physical contact coordinate measuring methods. This particular method can produce accurate physical part dimensions, but is deficient because it is time consuming to use due to the amount of data generated and because it cannot readily secure interior features of the object. Non-contact methods such as laser scanning are also capable of creating accurate part dimensions, but like the coordinate measuring methods are not readily capable of capturing internal part features. Interior features, such as surface geometries and structural elements cannot readily be captured by these methods and so they are of limited use.

There do exist methods and apparatus for capturing both internal and external features of a physical object. This is a desired and sought after ability both from the stand point of quality control of manufactured parts and because of the desire to be able to reverse engineer objects. Among the methods utilized for these ends are the non-destructive techniques of ultrasound imaging and computed tomography (CT). Ultrasound imaging is generally not accurate for reproducing physical measurements with the desired accuracy. While CT can produce modeling data of the desired accuracy, the equipment used to perform this type of operation or inspection is often quite expensive, with costs for the x-ray producing equipment, the housing for the equipment, the sensors for detecting the x-rays, and the computer resources necessary to operate the CT system often raising the cost to a figure in the one million dollar range. In addition, CT presents a radiation hazard and requires special facilities to use this equipment, which adds to the cost of their acquisition and use. Known methods of quality control and reverse engineering can also require substantial time investments in terms of human time and central processing unit or computer time. A need exists to reduce the time, cost, and repeatability of quality control sampling and to provide manufacturers a way to reliably and accurately reverse engineer an object.

Certain destructive techniques for capturing both internal and external features of a physical object a so exist. One of these is disclosed in commonly owned copending application Ser. No. 08/638,915 filed Apr. 25, 1996. That application discloses an effective technique which comprises the use of a shuttle which can move in a horizontal x direction and a z direction. The shuttle carries an encapsulated object to be digitized back and forth from a face mill to an area scanner. The face mill shaves a layer off of the top of the object. The shuttle then transports the object under an area scanner which scans the object and sends the data to a computer. A flag on the shuttle breaks a beam of light, signaling a computer to stop the shuttle so that the object is in alignment under the scanner. This position is referred to as the "x-home position." While the object is in the x-home position, an area scanner takes an image of the entire exposed surface area of the object. It is imperative that the object remain perfectly still during scanning. Once scanned, the shuttle and scanner are displaced on the z axis. Then the shuttle transports the object along the x-axis back toward the face mill, raises the object to a cutting position and another layer is cut from the object. This cycle may be repeated until the object is entirely delaminated.

Though this method is effective, it has certain shortcomings. The positioning of the object under the area scanner is crucial. The computer assumes that the shuttle is in precisely the same position during each successive scan, stacking successive images vertically to create the three dimensional image. Any actual variation in the x-home position results in a discontinuous stepping effect in the resulting computer model. Actual variations can arise from inconsistencies in the x-home position or from thermal expansion of the lead screw due to the heat generated while the object is being worked on or transported back and forth.

Another drawback of this method arises from the use of the area scanner. Even when the shuttle is in an accurate x-home position during successive passes, the area scanner is subject to inaccuracies inherent in the design of the scanner and its mounting and movement apparatus. The area scanner operates much like a photocopier. While the object to be scanned remains still, an imaging element is moved over the object to capture its entire image. The imaging element is normally powered by belts and slides along slots which are loosely fitted to the scanner so as to minimize friction. Such a traversing mechanism causes undesired, irregular movement of the scanner with resultant inaccuracies in image recording. Though these scanners are accurate enough for many applications, the present invention seeks to obtain higher levels of accuracy in image recording.

A final drawback of using area scanners is due to their size. Area scanners must be larger than the object being scanned. This results not only in an increased size of the entire machine, but also increases the amount of travel time expended while a part undergoes the delamination process. This drawback is further exacerbated by the extremely slow speeds that the shuttle must move while it's position is being fine tuned into an accurate x-home position.

It would be desirable to have an apparatus and method for creating three-dimensional modeling data from an object with a means of tracking the precise position of the shuttle throughout the digitizing process such that a computer can associate the images scanned with the actual positions of the object and assemble the three dimensional model accordingly.

It would also be desirable to have an apparatus and method for creating threedimensional modeling data from an object which incorporates a scanner that is firmly mounted and can record a series of successive images at an extremely high rate of speed such that the object being imaged can remain in motion under the scanner.

It would also be desirable to have an apparatus and method for creating three-dimensional modeling data from an object using a scanner which occupies relatively little space, thereby resulting in a reduced overall apparatus size and decreased object travel time.

SUMMARY OF THE INVENTION

It is an object of the present invention to provide new and improved apparatus that is not subject to the aforementioned disadvantages.

It is another object of the present invention to provide method and apparatus for selective removal of predetermined contours of material from an object of interest to expose a surface of interest.

It is still another object of the present invention to provide method and apparatus for acquiring data relative to each successively exposed surface of interest.

It is yet another object of the present invention to provide method and apparatus for manipulation of the data relative to a plurality of exposed surfaces of interest to produce a three dimensional electronic representation of the object of interest for display on a computer monitor, for printing on paper, or for other desired uses.

It is still yet another object of the present invention to provide method and apparatus for manipulation of the data relative to a plurality of exposed surfaces of interest to produce a surface three dimensional electronic representation of the object of interest for display on a computer monitor, for printing on paper, or for other desired uses.

It is another object of the present invention to provide method and apparatus for manipulation of the data relative to a plurality of exposed surfaces of interest to produce a solid three dimensional electronic representation of the object of interest for display on a computer monitor, for printing on paper, or for other desired uses.

It is still another object of the present invention to provide method and apparatus for acquiring data relative to an object of interest to provide quality control data for the manufacturer of the object.

The foregoing objects of the present invention are provided by an apparatus and method for producing three dimensional geometrical modeling data of an object of interest. The present invention includes means for selectively removing a predetermined contour of material from the object to produce an exposed surface of interest, apparatus for acquiring data representative of the exposed surface of interest, such as by scanning the exposed surface of interest, a shuttle for providing relative movement of the object between the material removal means and the data acquisition means, and a data processing means for converting the acquired data into three dimensional modeling data. In accord with the present invention the material removal means may be a face mill. A process for producing the three dimensional geometrical data may include the steps of encasing the object within a machinable encasing material to form an encasement; orienting the encasement at a desired orientation relative to the material removal means; selectively and repeatedly removing a predetermined contour of a predetermined thickness from the object to produce an exposed surface of interest; acquiring data relative to selected exposed surfaces; converting the exposed surface data into perimeter data representative of the surface features at the selected exposed surfaces, both internal and external, of the object; importing the perimeter data into CAD space; and lofting surfaces on the perimeter data to provide a three dimensional surface model of the object. In an alternative embodiment, the exposed surface data can be converted into surface data that can be imported into CAD space and converted into a three dimensional solid model of the object.

The embodiments of this invention, as described in more detail below, effect the foregoing objects in an improved manner by providing a fixed, sturdily mounted data acquisition device, more specifically a line scan camera, which contains a stationary lens thereby avoiding the introduction of inaccuracies into the computer model due to the movement of the camera lens. Moreover, the camera takes very narrow, two dimensional pictures in very rapid succession which allows the object of interest to remain in motion under the camera, with no resulting loss in resolution.

Furthermore, the use of a linear encoder greatly improves the computer's ability to track the precise position of the object of interest and assimilate the data received to form a more accurate electronic representation of the object. In a preferred embodiment, the linear encoder comprises a scale graduated at predetermined linear increments and a sensor which detects relative motion between the sensor and the graduations of the scale. The sensor and scale are positioned along the x-axis of object movement such that the sensor sends an electric pulse to the computer whenever it passes by a graduation. The computer keeps a tally of the pulses and computes the precise position of the object along the x-axis.

By receiving position input from the linear encoder, the computer can then calculate when to trigger the camera to capture an image and send the image electronically to the computer. The computer, knowing the x-positions of the images, can assimilate all of the thin, two dimensional images taken by the camera into an electronic representation of the scanned layer of the object. Each time a successive layer is scanned, the images are assimilated to form in electronic representation of the layer in an x-y plane, and stacked upon the previous layer in a z-direction. Recording the x-positions of all of the images allows the computer to accurately stack the layers in the z-direction to form an accurate 3-dimensional electronic representation of the object configuration.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 5 is a diagram illustrating the cycle of the operation of the present invention including the relative movement of an object during material removal and data acquisition;

FIG. 6 is a partial cross sectional view of a representative object that is encased within an encasing material to form a machinable encasement;

DETAILED DESCRIPTION OF THE INVENTION

Figure 1:
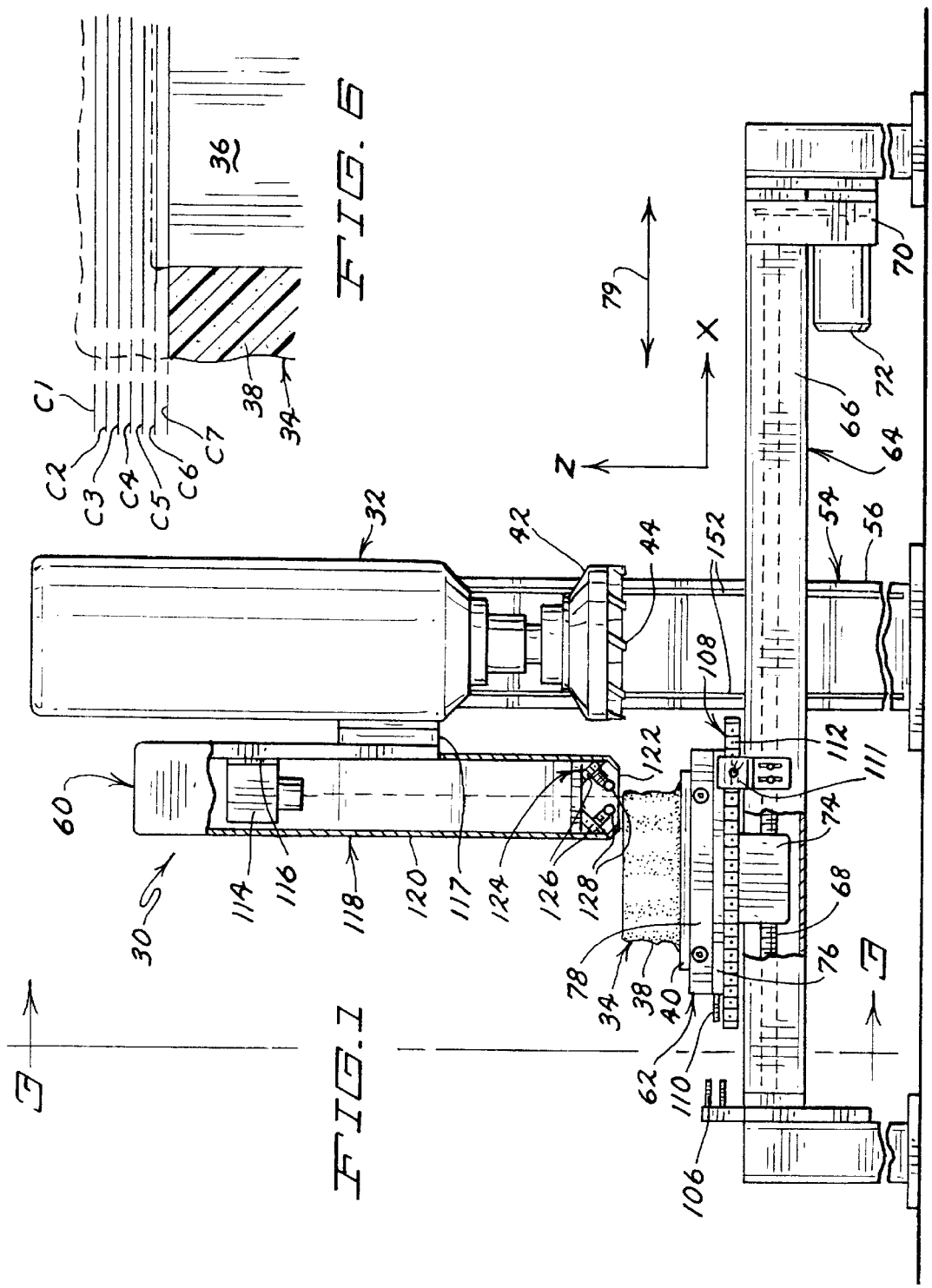
FIG. 1 is a side elevation view of an embodiment of the present invention.

The present invention is represented in its broadest form in FIG. 1 of co-pending application Ser. No. 08/638,915, filed Apr. 25, 1996. A preferred embodiment of this invention is described below and shown first in FIG. 1 of this application. It will be understood that the embodiment shown and described herein would have the necessary guards and surrounding housing to make the operation to be described below safe and efficient and that these items have been omitted for the sake of clarity in describing and illustrating the present invention. The embodiment can best be described in relation to an x-axis, a y-axis, and a z-axis, all of which are perpendicular to each other. For purposes of clarity, the z-axis will be said to be a vertical axis while the x-axis and y-axis will define a horizontal plane. However, using this convention should not be interpreted as limiting the orientation of the present embodiment, as the apparatus of the invention could operate at any angle or orientation. For example, the x-axis could be vertical while the z-axis and the y-axis define a horizontal plane. Alternatively, any number of the three axes could extend along some angle between horizontal and vertical. In other words, the apparatus herein described does not rely on gravity for any function other than to support itself and would be unaffected if tilted at any angle so long as it was supported accordingly.

Figure 4:
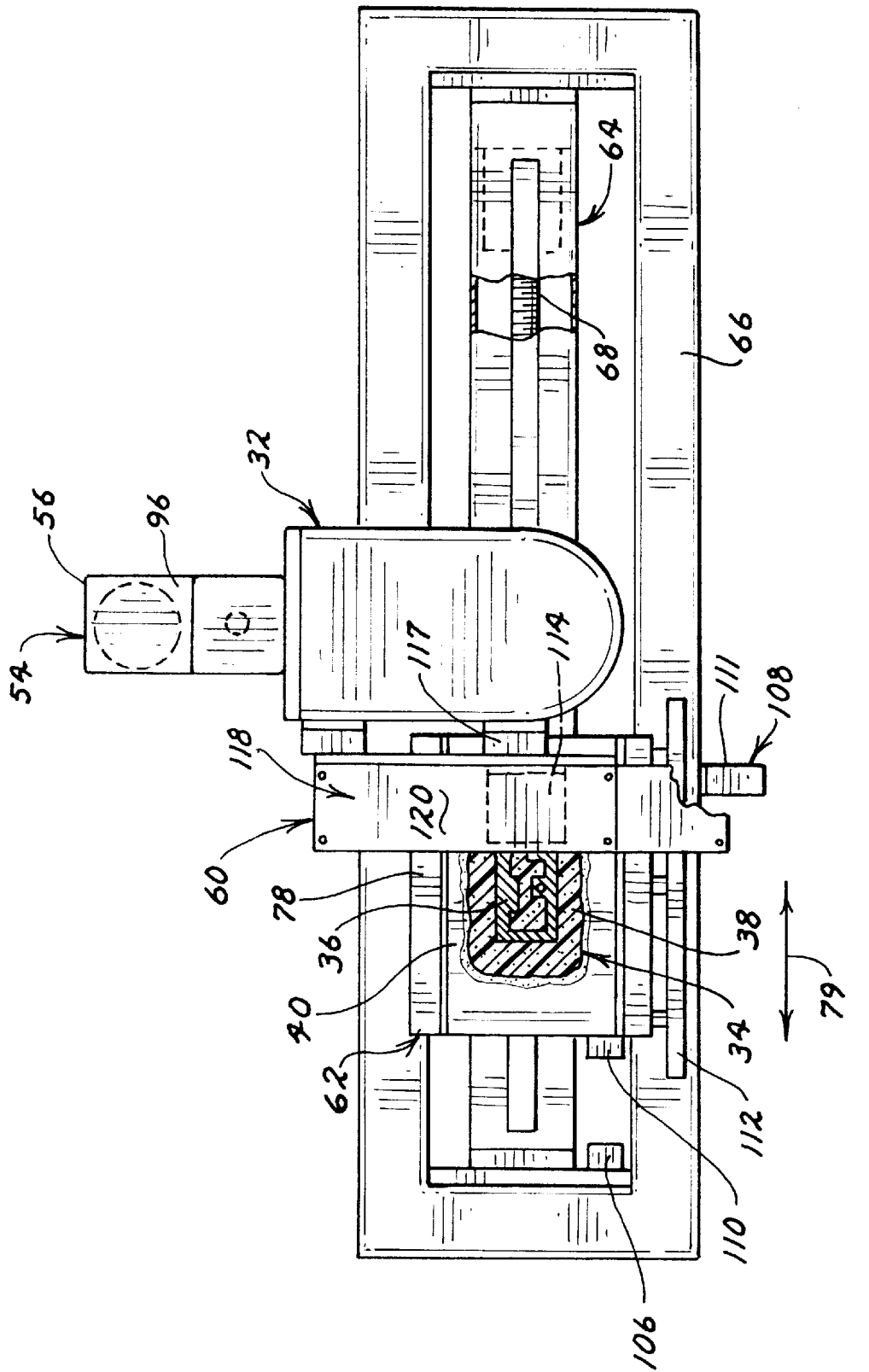
FIG. 4 is a top elevation view of the embodiment shown in FIG. 1.

An apparatus 30 in accord with the present invention may include a face mill 32 for selectively removing predetermined contours of material from an encasement 34. Encasement 34 includes an object of interest 36, as shown in FIG. 4, enveloped or encased within a machinable material 38. Machinable material 38 may be any material suitable for anchoring the object 36 to a machinable support 40. Thus, material 38 may be an epoxy-type of material and support 40 may be a wooden, plastic, metal or similar block.

Figure 2:
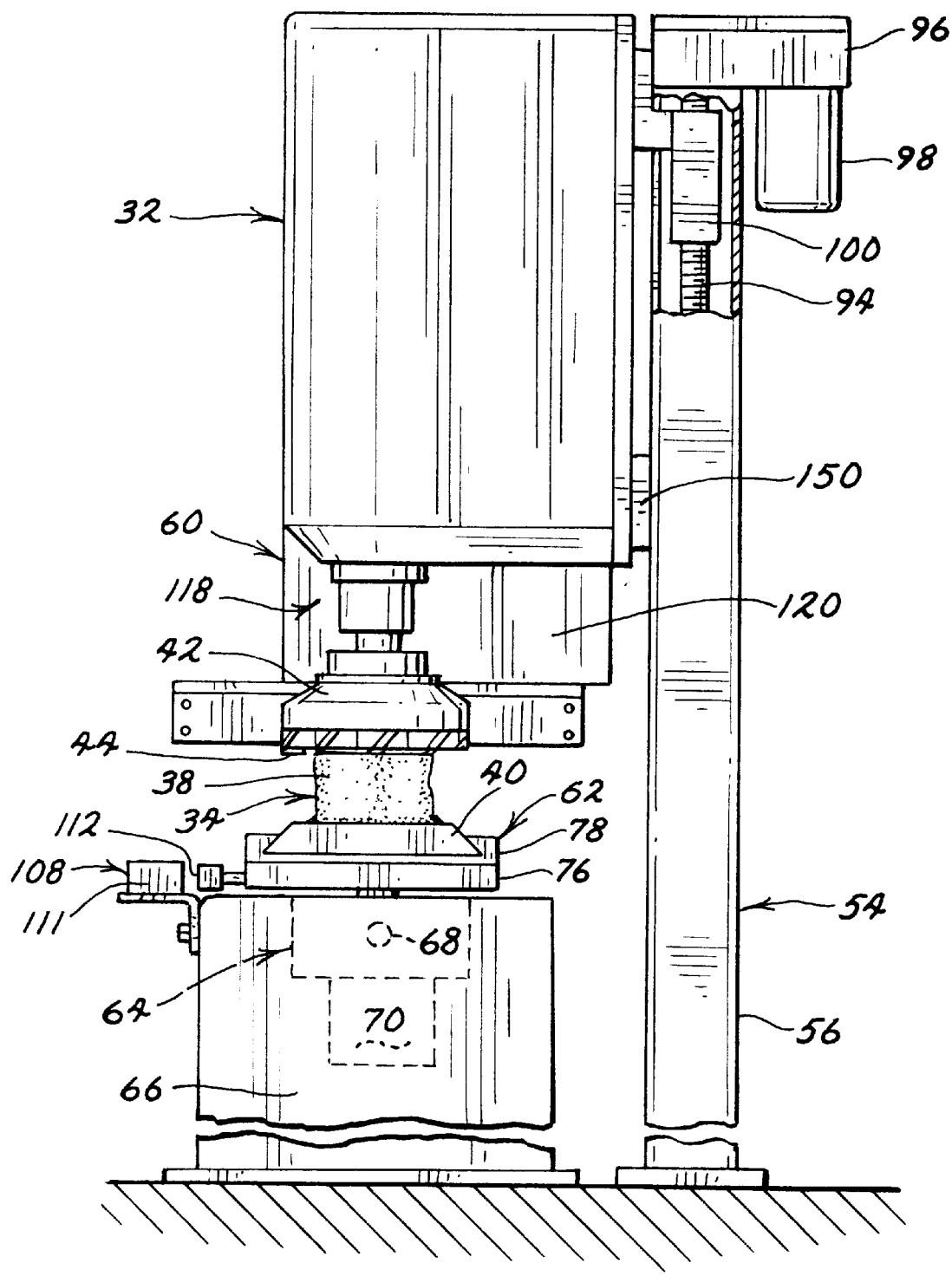
FIG. 2 is a right end elevation view of the embodiment as viewed in FIG. 1.

Mill 32 includes a cutting head 42 having a plurality of replaceable cutting inserts 44, only one of which is shown for clarity, for removal of a contour of material from the encasement 34 and object 36. Cutting head 42 may be driven directly by a motor or may be rotated by means of a pulley drive, as illustrated for example in FIG. 4 of copending application Ser. No. 08/638,915. Mill 32 may be of the type manufactured and sold by Sumitomo-Electric. Such a mill can rotate the cutting head 42 at sufficient speeds to cut hard metals, such as steel, and is also capable of cutting materials such as plastic. Mill 32 will be positioned such that cutting head 42 is adjustably disposed along a z-axis in an elevated position relative to encasement 34 by a mill support 54. Mill support 54 is best shown in FIG. 2 and comprises a support column 56 with an inside 57 and an outside 58, the inside 57 containing a z-lead screw 94 mounted on its ends by appropriate bearings (not shown), a support nut 100 which threadably receives the z-lead screw 94, and a z-motor 98 which provides rotational power to the z-lead screw 94 via a first power transmission linkage 96. Linkage 96 could be any of a variety of arrangements such as belts or gears. Mill 32 is mounted to nut 100 by known means such as threaded fasteners and bolts. Additional support for mill 32 may be obtained by providing vertical runners 150 along mill 32 which are slidably received by vertical slots 152 extending vertically along support column 56. As seen in FIG. 2, when screw 94 is rotationally driven by motor 98, nut 100 will be raised or lowered in the vertical or upright direction, carrying mill 32 therewith.

Apparatus 30 will also include a data acquisition station 60 and a shuttle mechanism 62. Shuttle mechanism 62, to be described immediately hence, transports encasement 34 along an x-axis, under the face mill 32 and the data acquisition station 60 and may also provide motion perpendicular thereto, along a y-axis. It will be understood that shuttle mechanisms other than that to be described below are commercially available for providing motion to a shuttle table in two orthogonal directions and that the present invention contemplates their use in accord therewith.

To provide x or horizontal direction motion of the shuttle table 76 under the face mill 32 and the data acquisition station 60, a rodless cylinder 64 may be advantageously utilized. Rodless cylinder 64 may be of the type manufactured by Industrial Devices Corporation of Novato, California. As best seen in FIG. 1, rodless cylinder 64 includes a housing 66 and a x-screw 68 extending therethrough. Screw 68 is mounted at each end by appropriate bearings (not shown) and is rotationally driven by a second power transmission linkage 70, such as through an appropriate timing belt or gear arrangement, by an x-motor 72. A nut 74 threadably receives the screw 68 and travels along the x-axis as the screw 68 is rotated. A shuttle table 76 is attached to the nut 74 by known means such as threaded fasteners and nuts and a mounting block 78 is in turn attached to the shuttle table 76 by known means such as threaded fasteners and nuts. The encasement 34 is attached in any known manner, such as bolting, to the mounting block 78. As screw 68 is rotationally driven by the motor 72, nut 74, and consequently table 76 and encasement 34, will travel along the x-axis under the face mill 32 and the data acquisition station 60 as indicated by double-headed arrow 79.

Shuttle mechanism 62 also includes an x-position detector 106 and a flag 110. Detector 106 may be any known type of sensor, such as an infrared photo-Darlington type of sensor. Detector 106 aids in the control of the motion of the shuttle table 76 by establishing and communicating to a control means such as a computer 180, an x-home position which is used to measure subsequent relative positions of the shuttle table 76 along the x-axis throughout the delamination process. This process is explained in more detail below.

Shuttle mechanism 62 also includes a position detection device, preferably a linear encoder 108 with an x-motion sensor 111 and a x-scale 112 which is graduated at predetermined linear increments. Linear encoder 108 may be any known type of linear encoder, such as a Mitutoyo Linear Scale Unit, made in Japan and distributed by Great Lakes Metrology of White Lake Mich. Linear encoders 108 aids in the control of the motion of the shuttle table 76 by relaying a signal to a control means, such as a computer 180. The signal is generated by the sensor 111 as it passes by each predetermined incremental graduation of the scale 112.

Figure 3:
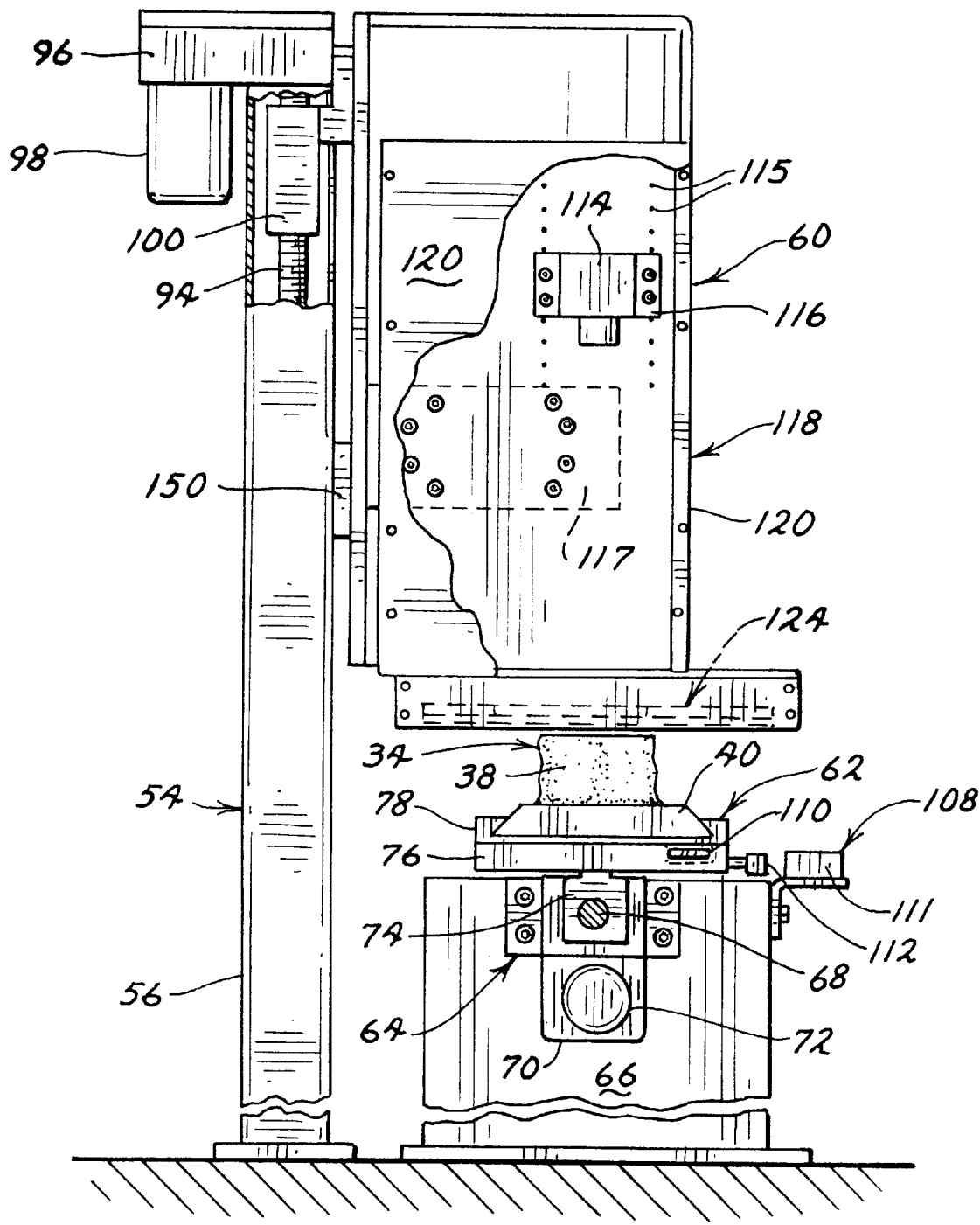
FIG. 3 is a left end elevation view of the embodiment as viewed in FIG. 1, partially in section.

The sensor 111 consists of a light emitting diode (LED), an index scale, and a photoelectric device (the components of the sensor 111 are not detailed in the Figures). The x-scale 112 is made of glass and has a mirrored back. The x-scale 112 and the index scale are both similarly scored at predetermined linear increments to block the passage of light through the scales at the location of the scores (these scores are too small to be seen with the naked eye but are shown enlarged on the x-scale 112 of FIG. 1 for clarity). Light from the LED is directed toward the x-scale 112 such that it passes through the scores, is reflected off the mirrored surface, passes again through the scores of the x-scale 112, passes through the scores of the index scale on the sensor 111, and strikes the photoelectric device of the sensor 111, thereby generating an electric signal. When the encoder 108 is positioned such that there is relative motion between the sensor 111 and the scale 112 whenever the shuttle table 76 is moved, the quantity of light from the LED which is read by the photoelectric device of the sensor 111, varies with the same period as the separation of the scoring. These variations are converted into electrical signals and output as two waves, wave A and wave B, with a phase difference of 90 degrees. The computer 180 can read these waves as pulses and can then determine the position of the object 34, its speed, and its direction of movement, and can control its speed and location throughout the material removal, data gathering, and shuttling processes. Preferably, the x-scale 112 is mounted on the shuttle table 76 for travel therewith, and the x-motion sensor 111 is mounted on housing 66 in close proximity to the x-scale 112, as by mounting bracket 113 shown in FIGS. 1,2 and 3, such that the sensor 111 faces the x-scale 112 and can sense the light pulses passed through the predetermined incremental graduations of the scale 112. Alternatively, the x-scale 112 could be mounted on housing 66 and the x-motion sensor 111 on shuttle table 76 in similar facing proximity with each other.

In an alternative embodiment (not shown) shuttle mechanism 62 has a means to move shuttle table 76 along a y-axis. This would allow delamination of an object of interest 36 which is too wide to be processed by moving it back and forth only along the x-axis. The operation of this embodiment is explained in more detail below.

Data acquisition station 60 includes a data acquisition device 114 supported in an elevated position above rodless cylinder 64 by bracket 116 which is mounted to a vertical side wall 120 of a protective shroud or cabinet 118. A mounting connection 117 serves to rigidly and stably secure data acquisition device 114 to the solid mass of face mill body 32 by way of shroud 118. Device 114 is mounted such that the distance along the z-axis between the lens of the device 114 and the cutting surface of the replaceable inserts 44 is substantially equal to the focal distance of the device 114. Device 114 may be a line scan camera of the type manufactured by Dalsa, Inc. This type of scanner is capable of achieving a high resolution image of a moving object. This is an improvement over the use of an area scan camera, such as that used in the prior art, as the line scan camera is more focused, provides a sharper image, is more consistent, and is less prone to image degradation due to chips and shavings. Most importantly, the alignment of the object 34 to be scanned is not nearly as crucial as with the use of an area scanner. With the area scanner, the object to be scanned has to be aligned prior to scanning each layer such that the object 34 is in precisely the same position as it was during the previous scan. Failure to do so results in discontinuities between successive scans which creates a stepping effect in the z or vertical direction.

The use of a line scan camera overcomes this problem by scanning a moving object and associating the images taken with the x-directional data received from the linear encoder 108. As the encasement 34 moves under the scanner 114, the scanner 114 takes very narrow, line-shaped pictures, which extend the width of the encasement 34, in rapid succession until the entire encasement 34 has passed beneath the scanner 114. Each narrow picture is digitized and stored in the computer along with its position along the x-axis as read by the linear encoder 108. No alignment is necessary between successive passes.

The performance of data acquisition device 114 may preferably be enhanced by covering the device with protective shroud 118. Shroud 118 can be made of any rigid material used to form walls 120 around the data acquisition device 118 which protect the device from dust and shavings and also define a shroud opening 122 between the device 114 and the rodless cylinder 64. Opening 122 is large enough to allow device 114 to focus on an encasement 34 without being obstructed.

Data acquisition device 114 is preferably initially vertically adjustably mounted on shroud wall 120 by selective attachment of bracket 116 to horizontally aligned pairs of mounting holes 115. This permits initial focusing of the data acquisition device or camera 114 of the object 36.

It is envisioned that a light source 124 may be mounted on the walls 120 of the shroud 118 proximate the opening 122. The light source 124 provides a controlled illumination level to the encasement 34 and object 36 throughout the data acquisition process. In a preferred embodiment, the light source 124 comprises a plurality of light fixtures 126 which can removably receive replaceable light bulbs 128 such that different bulbs could be selected for varying levels of desired illumination. For example, if the object of interest 36 is a shiny metal, a lower level of illumination and more diffuse light source may be desired. If the object 36 is a flat-colored plastic, a higher intensity bulb that is partially covered with reflective material such that the light can be intensified and directed toward the object 36 may be preferred.

OPERATION OF THE PRESENT INVENTION

With the foregoing description in mind, the operation of the apparatus 30 in accord with the present invention can be described with reference to the Figures, and particularly FIG. 7. The general operation of the present invention will be first explained with reference to FIGS. 7A and 7B. The conversion of the acquired data into a surface model is in accordance with the teachings of co-pending application Ser. No. 08/638,915 filed Apr. 25, 1996, herein incorporated by reference.

First, an object of interest 36 whose internal and external geometry is desired to be reproduced in ;n electronic medium is selected as indicated at 200. The object of interest 36 is appropriately cleaned and prepared as indicated at 202 and a feature of interest is defined as indicated at 204. The object 36 is then encased in the preselected encasing material 38 as indicated at 206 to form the encasement 34. The encasement 34 can then be mounted to the support 40 as indicated at 208 and as shown in FIG. 4. The encasing material can also serve to mount the object 36 to the support 40, in which case steps 206 and 208 are combined into a single step. The encasing step, whether separate or joined with the mounting step, should be accomplished as taught by co-pending application Ser. No. 08/638,915, filed Apr. 25, 1996. After the encasement 34 is mounted as desired to the support 40, the support 40 will be attached to the mounting block 78 using conventional techniques such as screws 120, which are best seen in FIG. 4, as indicated at 210.

After the encasement 34 and support 40 have been attached to the mounting block 78, various physical parameters of the encasement 34 will be obtained, including the height, length and width of the encasement 34 as indicated at 212. This step may be taken if desired before the encasement 34 is mounted to the machinable support 40 at 208. This information will be entered into computer 180 (FIG. 8) or like computational means containing an appropriate microprocessor. The feed speed, that is, the rate at which the shuttle table 76 is translated in the x-direction into the face mill 32 for contour removal, is determined and entered into computer 180 as indicated at 214. The feed speed will vary depending principally on the material out of which the object 36 is manufactured. For harder materials, such as steel, aluminum, and other metals, the feed speed will be less than where the object 36 is manufactured of, say, a synthetic material such as nylatron. Other operational parameters will be determined, such as the desired contour thickness as indicated at 216 and the scan pixel density as indicated at 218, and will be entered into computer 180.

All of the preceding steps are to be performed in accordance with the teachings of co-pending application Ser. No. 08/638,915, filed Apr. 25, 1996.

The last step to be taken prior to material removal and data acquisition is to select and install a light bulb or bulbs 128 as shown at 220. Generally, for shiny materials such as metals, a more diffuse light source, such as flourescent bulbs, is desired. As the replaceable cutting inserts 44 cut a metal object of interest 36, they encounter wear. This results in a different finish as the cutting head 42 exposes different layers of the object of interest 36. Using a diffuse light source prevents too much or too little light being reflected into the lens of the data acquisition device 114. If the object of interest 36 is a plastic material, a more directed light source may offer better illumination. Flat-colored materials reflect less light than shiny materials so it is envisioned that a light bulb 128 which is heavily coated with phosphorescence may be used. The phosphorescent material, applied to approximately 270 degrees of the circumference of a cylindrical flourescent bulb 128, reflects all of the light produced so that the light exits the bulb 128 through the portion that is not coated. This results in a stronger beam of light which may be directed at the encasement 34 so that it is reflected into the lens of the data acquisition device 114.

With the foregoing information, the computer 180 can begin material removal and data acquisition according to a previously arranged program. Thus, referring now to FIGS. 5, 7, and 8, the computer 180 will send the appropriate signal to the z-motor controller 160 of the z-motor 98 over the appropriate communication link 182 as indicated at 221. This signal will thereby cause the z-motor 98 to turn z-lead screw 94 via first power transmission linkage 96. The screw 94 will rotate, carrying support nut 100 and face mill 32 to a position slightly higher than the height of the encasement 34 which was entered into computer 180 at step 212 of FIG. 7A. Preferably, this height should be such that the topmost portion of the encasement 34 is near the cutting plane defined by the rotation of the cutting inserts 44 of face mill 32. It is preferable that the encasement 34 be disposed too low such that no material be removed from the encasement on the first and subsequent passes through the face mill 32 than it is to have the encasement disposed too high and remove too thick a contour of material. Removing too thick a contour on the first pass could result in the loss of object geometry and/or overload the face mill 32 and perhaps cause a mechanical breakdown of the mill 32.

Figure 7A:
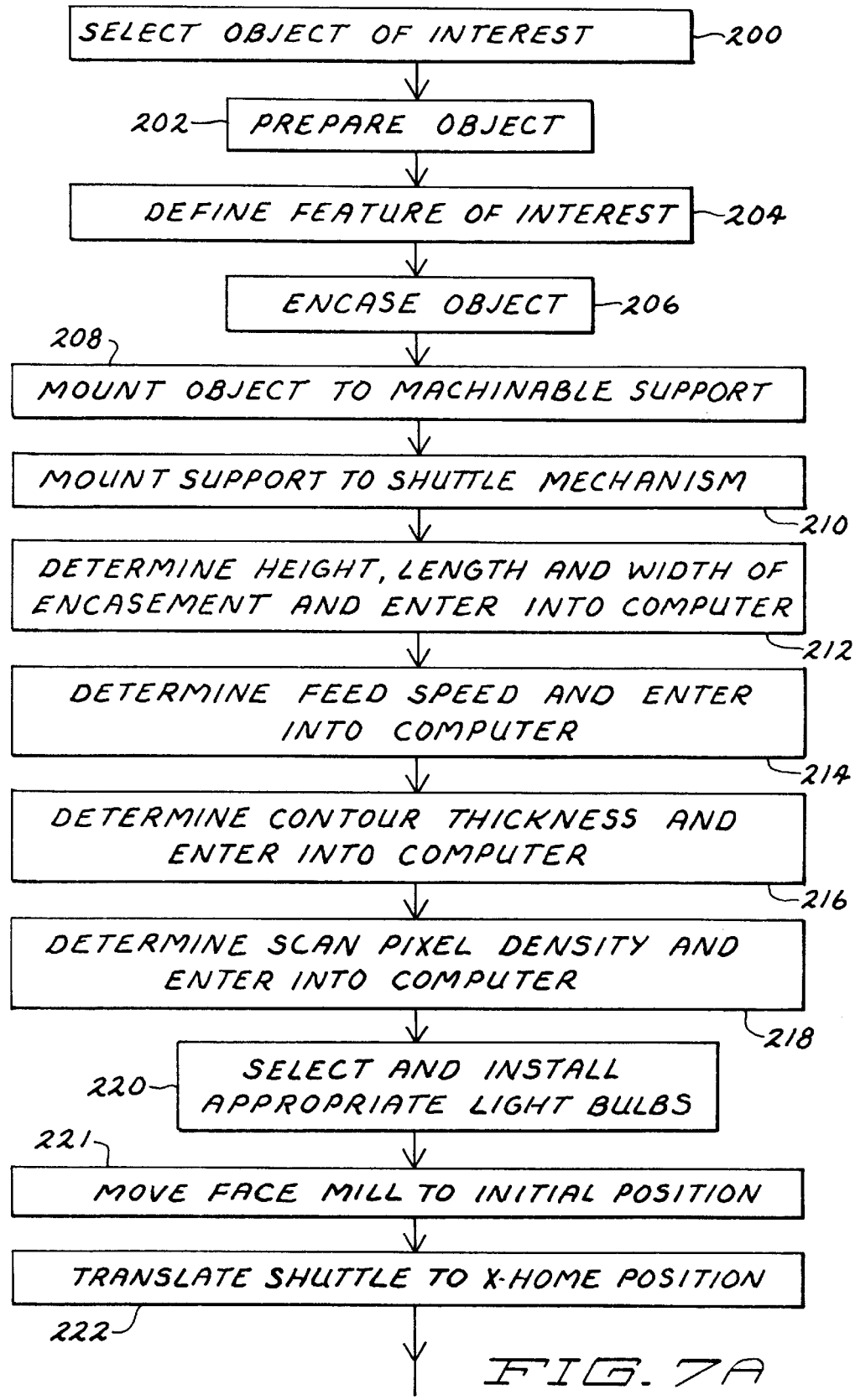
FIG. 7 shown on three sheets as FIGS. 7-A, 7-B, and 7C, is a flow chart illustrating the operation of the embodiment of the apparatus shown in FIG. 1.

The computer 180 will next send a signal over an appropriate communication link 184 to x-drive motor controller 162 of x-motor 72 to cause the shuttle table 76 to be translated along the x-axis to its x-home position as indicated at 222 of FIG. 7A. As the shuttle table 76 approaches the x-home position, flag 110 will break a beam produced by x-position detector 106, thereby providing a signal to computer 180 over an appropriate communication link 186. Computer 180 will then send the appropriate signal to x-drive motor controller 162 over communication link 184 to stop the x-motor 72, thus ceasing the translation of the shuttle table 76 along the x-axis.

Once the shuttle table 76 is at its x-home position, the linear encoder card 109 of the computer 180 will be zeroed such that the computer's tally of pulses sent by the x-motion sensor 111 to the computer 180 over communications link 194 starts from the x-home position. This is shown at 224 of FIG. 7B. Throughout the remainder of delamination process, the computer 180 will calculate the position and speed of the shuttle table 76 by totaling the number of positive and negative pulses sent by the x-motion sensor 111 over communications link 194 as the linear increments of the x-scale 112 pass by the sensor 111.

These pulses are generated whenever there is relative movement between the x-scale 112 and the sensor 111. The sensor has a light-emitting diode (LED) which shines through score marks on the surface of the glass x-scale 112, reflects off of the mirrored back of the x-scale 112, and travels back through the scoring toward the sensor 111. Once the light hits the sensor 111, it travels through the scoring of index scale of the sensor 111, which is similar in thickness and separation to the scoring of the x-scale 112, and hits the photoelectric sensing device of the sensor 111. As the index scale passes by the x-scale 112, the alignment of the scores alternates between light passing alignment and light blocking alignment, thereby creating a pulsing effect or a sinusoidal wave of light intensity. The photoelectric device of the sensor 111 converts this pulsing light into two electrical waves with phase A and phase B having a phase difference of ninety degrees.

A positive pulse is defined as a pulse wherein phase A leads phase B by ninety degrees. A negative pulse is defined as a pulse wherein phase A lags phase B by ninety degrees. This is merely a convention used by the computer 180 in order to determine the direction of movement of the shuttle table 76. A positive pulse could just as effectively be defined as a pulse wherein phase A lags phase B by ninety degrees and a negative pulse as a pulse wherein phase A leads phase B by ninety degrees. By keeping a tally of the positive and negative pulses, and knowing the distance of separation between the graduations, the computer 180 can compute the position of the shuttle table 76 relative to the x-home position. Once the linear encoder card 109 of the computer 180 is zeroed, there is no need for the shuttle table 76 to return to the x-home position.

It should be noted that linear encoder 108 is commercially available and the present embodiment of the invention contemplates the use of any adequately performing linear encoder. Not all linear encoders perform in precisely the manner herein disclosed and the disclosure of the model above is not meant to limit the scope of the invention to the use of such an encoder. For example, some encoders use a light source which is positioned on the side of the scale opposite the sensor. The scale does not have a mirrored back so the light may shine through the scale to the sensor. Such a model could also be used on the present invention.

Figure 7B:
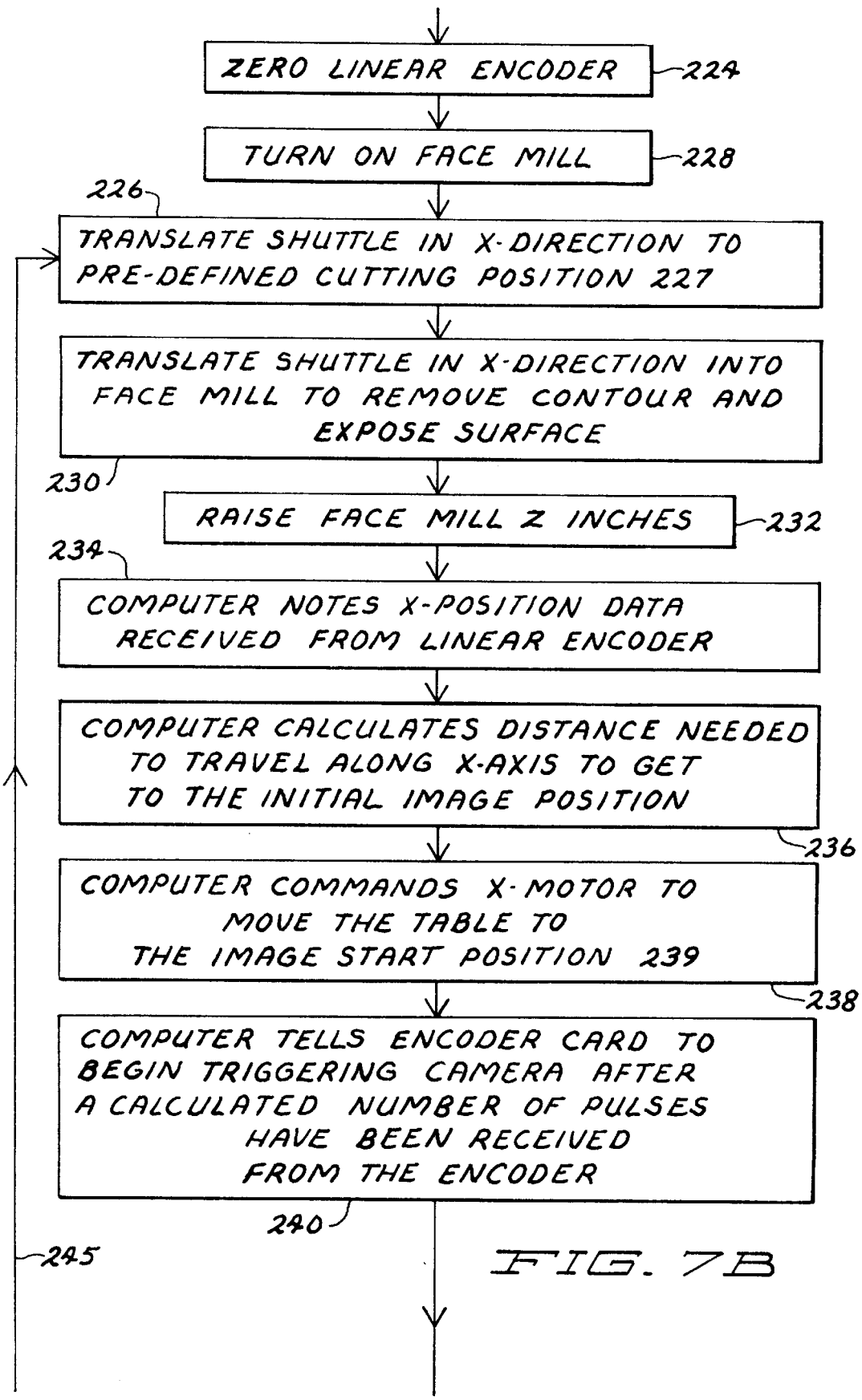
Figure 8:
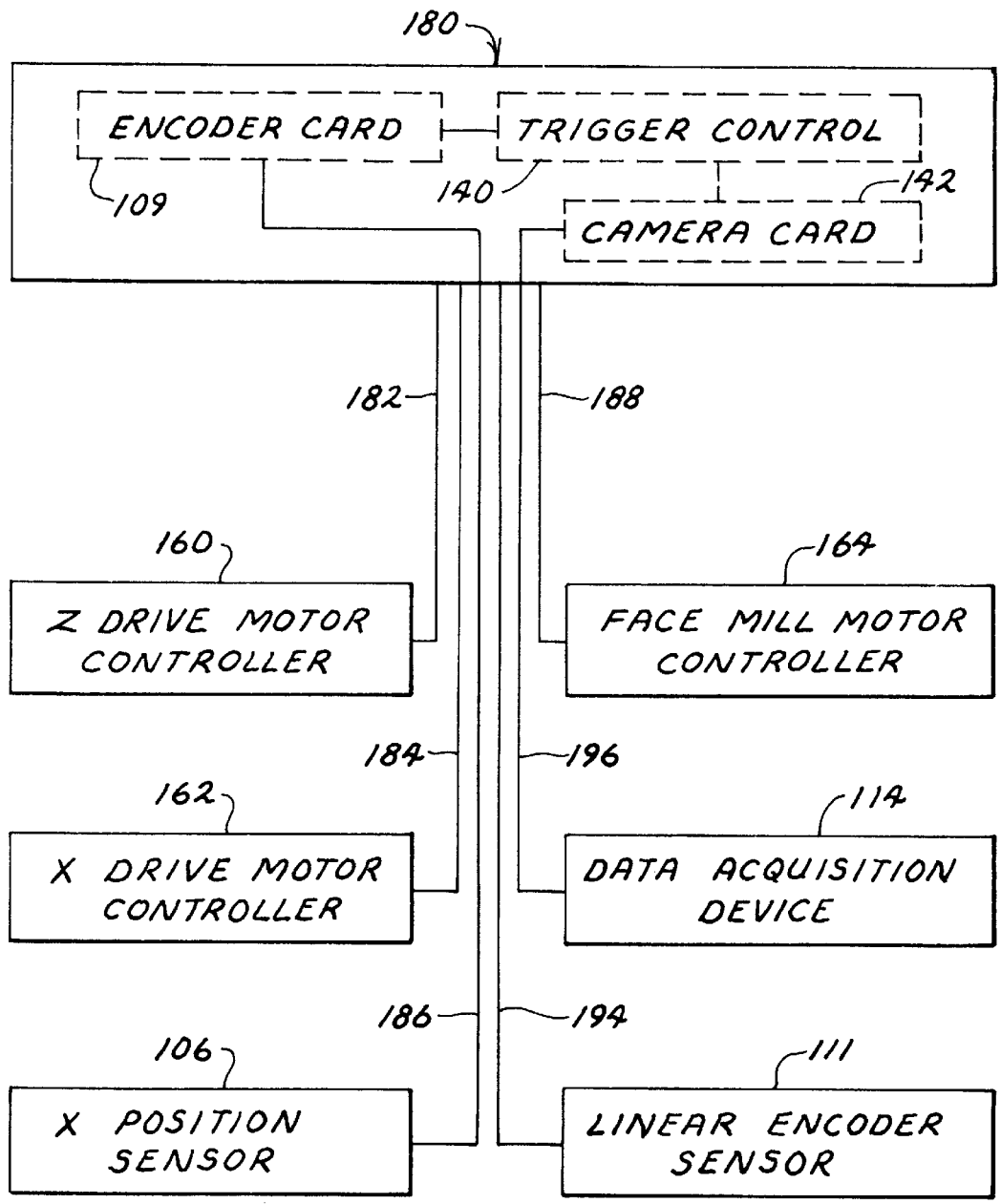
FIG. 8 is a schematic diagram illustrating the control system for the present invention.

Referring now to FIGS. 5 and 7B, and 8 as indicated at 226, the computer 180 will command the x-drive motor controller 160 of the x-motor 72 to turn such that shuttle table 76 is rapidly translated to a pre-defined cutting position 227 calculated by the computer 180 using the inputs from step 212 of FIG. 7A. Next the computer 180 will send a signal over an appropriate communication link 188 to the face mill motor controller 164 of the face mill motor 52, commanding the motor 52 to start the rotation of the cutting head 42 as indicated at 228. This occurs on the first pass only, after which the cutting head 42 will remain spinning. When the cutting head 42 is rotating at the desired speed, the computer will command the x-drive motor controller 162 to translate shuttle table 76 and attached encasement 34 into face mill 32 at the predetermined feed speed, as indicated at 230. Mill 32 will remove an initial contour of material to expose a surface C1 as seen in FIG. 6. The manner in which the mill 32 removes the material from the encasement 34 is that same manner taught in co-pending application Ser. No. 08/638,915, filed Apr. 25, 1996.

Figure 7C:
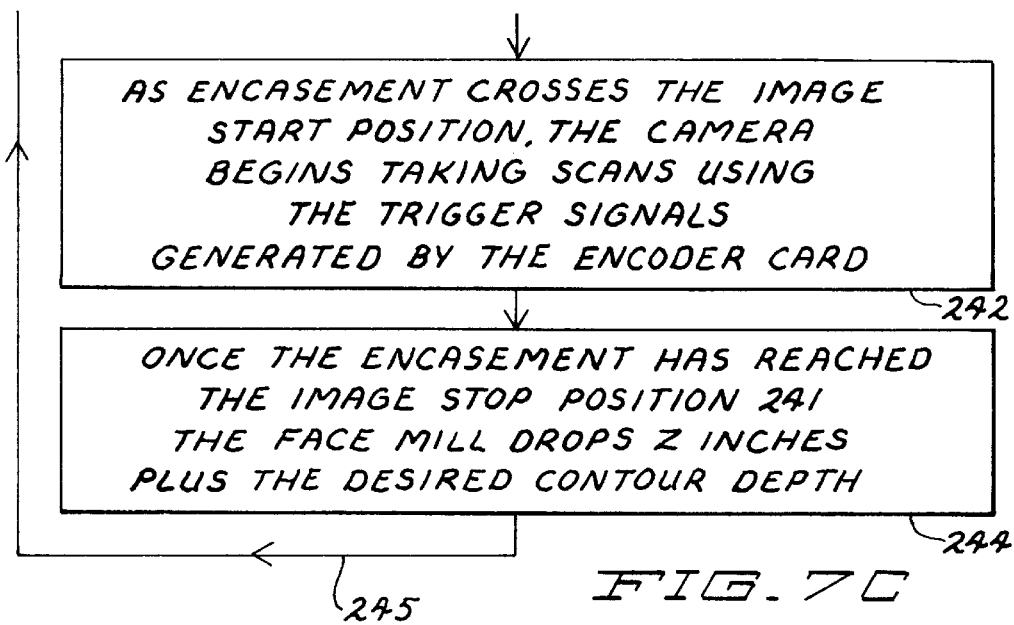

After removal of the initial layer of material from the encasement 34, the cutting head 42 will be displaced a predetermined amount along the z-axis, preferably on the order of 0.002 inches, by the appropriate command from computer 180 to z-drive motor controller 160 as indicated at 232. In the embodiment shown this is accomplished by raising cutting head 42. It is to be understood that the desired z-axis displacement of cutting head 42 and encasement 34 could be accomplished by z-axis movement of the shuttle table 76. The computer 180 will then note the x-position data received from the linear encoder as indicated at 234. The computer 180 uses this data to calculate the distance, more specifically the number of pulses, needed to travel along the x-axis to get to the initial image acquisition position 239 as indicated at step 236. As shown at 238, the shuttle table 76 will then be translated along the x-axis to start position 239 under the data acquisition station 60 at a predetermined speed, which is usually faster than the feed speed during material removal. The computer then commands the trigger control 140 to begin triggering the camera card 42 to send signals to the data acquisition device 60 over communications link 196 after the number of pulses calculated at 236 have been received from the encoder 108 via the encoder card 109. This occurs along path 242 as indicated in FIGS. 5, 7C, and 8. Once the first trigger signal is sent to the device 60, additional trigger signals are sent on every $n^{th}$ pulse from the encoder 108 as indicated at 240. The number "n" is a function of the desired scan pixel density entered at step 218 of FIG. 7A.

Referring to step 244 of FIG. 7C, once the computer 180 has determined that the encasement is beyond the data acquisition station and at point 241 shown in FIG. 5, based on the tally of the pulses sent by the linear encoder 108, the computer 180 will next command the x-motor 72 to stop, and the z-motor 98 to lower the cutting head 42 the same distance "a" the cutting head 42 was raised at step 232 plus the predetermined cutting depth "b" from step 216, as illustrated diagrammatically in FIG. 5. The cycle is then repeated from step 226, with successive contours of encasement being removed, such as layers C2–C7 as shown in FIG. 6, with the thickness "b" of each contour being determined at step 216. This cycle of material removal and scanning will continue until the face mill 32 has completely milled away the encasement 34. With the example shown in FIG. 6, object 36 has a substantially planar upper surface, thus necessitating the removal of several contours, specifically C1–C5, before any object material is removed. It will be seen that as contour C6 was removed, a layer of material 190 was removed and that as contour C7 was removed, a layer of material 192 was removed, each removal exposing a surface to be scanned.

The series of linear images taken by camera 114 on each image acquisition step 242 are assimilated by computer 180 into a two dimensional image of each successively exposed surface of the object 36.

The remainder of the process of taking an object and creating a three-dimensional electronic representation is in accordance with the teachings of co-pending patent application Ser. No. 08/638,915 filed Apr. 25, 1996.

An alternative embodiment of this invention (not shown in the Figures) operates in essentially the same way except that shuttle mechanism 62 has a means for moving the shuttle table 76 along a y-axis as well as an x-axis. This method can be used to process parts which are too wide to be processed without y-axis movement. In operation, the shuttle table 76 moves the encasement 34 along the x-axis under the face mill 32 so that a first half of the initial layer of the material is removed. The shuttle table 76 then moves along the y-axis such that a second half of the encasement 34 is in alignment in a x-direction to be worked on by the face mill 32. Once in alignment, the shuttle table 76 moves back under the face mill 32 to remove the rest of the layer. The second half of the encasement 34 is then scanned as it passes under the data acquisition station 60. Once the encasement has traveled far enough along the x-axis to be clear of the data acquisition station 60, the shuttle table moves again along the y-axis such that the first half of the encasement 34 is in alignment in the x-direction to be scanned. After the object passes under the data acquisition station 60 and is scanned, the face mill 32 lowers along the z-axis an amount equal to the desired layer depth. This cycle continues until the encasement 34 is gone. The computer 180 assembles the two halves of data scanned from each layer.

The present invention having thus been described, other modifications, alterations, or substitutions may now suggest themselves to those skilled in the art, all of which are within the spirit and scope of the present invention. For example, the entire machine could be rotated so that the cutting head 42 cuts in a vertical plane or an angled plane. It is therefore intended that the present invention be limited only by the scope of the following claims.

What is claimed is:

1. An apparatus for producing electronic data representations of an object comprising:

a data gathering station;

a material removal station; and a shuttle providing relative movement of the object between said stations along a path defined by an x-axis;

wherein said data gathering station comprises:

an image data acquisition device for successively acquiring images of the object after removal of a predetermined contour; and an electronic device operatively associated with said image data acquisition device for receiving and storing said images;

wherein said material removal station comprises:

a tool constructed and arranged to remove a predetermined contour of material from the object; and a drive mechanism constructed and arranged to provide relative movement between the tool and the object, a component of the movement being along a z-axis which is perpendicular to said x-axis, such that the tool can be moved into and out of relative material removing engagement with said object;

wherein said shuttle comprises:

a table for holding the object;

a drive mechanism constructed and arranged to provide relative movement between said table and the tool along said x-axis such that the object and the tool are moved in material removal alignment for removing a predetermined contour of material from the object and in imaging alignment to said image data acquisition device after removal of a predetermined contour; and position determining apparatus operatively arranged to determine the relative locations of the object and the tool along the x-axis and to actuate the image data acquisition device at predetermined positions of the object relative to the tool and comprising a linear encoder with a scale and a sensor and a computer, the scale having predetermined linear increments, the sensor being constructed and arranged to send signals to the computer in response to the relative movement between the sensor and the scale, the computer being programmed to determine the position of the scale relative to the sensor in response to the signals received from the sensor, the scale and sensor being operatively associated with each other such that the position of the object relative to the tool along the x-axis is incrementally determined by the computer.

2. The apparatus of claim 1 wherein the drive mechanism is constructed and arranged to move the table along the x-axis to provide the relative movement between the object and the tool, with the tool being stationary.

3. The apparatus of claim 2 wherein the scale is stationary and the sensor is attached to the table such that the sensor moves with the table in close proximity to the scale.

4. The apparatus of claim 2 wherein the sensor is stationary and the scale is attached to the table such that the scale moves with the table in close proximity to the sensor.

5. The apparatus of claim 1 wherein the image data acquisition device comprises a line scan camera which takes linear images along a y-axis extending substantially perpendicular to the x-axis.

6. The apparatus of claim 5 wherein the camera is triggered by signals generated by the position determining apparatus.

7. The apparatus of claim 1 wherein the image data acquisition device comprises a camera and the material removal station comprises a casing on which the camera is mounted for initial adjustment along said z-axis until a focal point is achieved, the camera then being locked in place such that the distance between the camera lens and the object is fixed while data is being gathered by the data gathering station.

8. The apparatus of claim 7 wherein the casing is a solid structure to which the camera is stably secured.

9. The apparatus of claim 1 wherein object illuminating lights are positioned at the data gathering station to direct light onto the encasement and the object when they are in imaging alignment with said image data acquisition device.

10. The apparatus of claim 9 wherein the image acquisition device is a camera with a lens mounted within a shroud having an opening at one end opposite and in alignment with the camera lens, and said lights being positioned within the shroud in proximity to the opening to direct light through the opening.

* * * * *